Dec. 29, 1953
C. J. STALEGO
2,663,903
METHOD AND APPARATUS FOR PRODUCING FIBERS
Filed Nov. 2, 1948
2 Sheets-Sheet 1
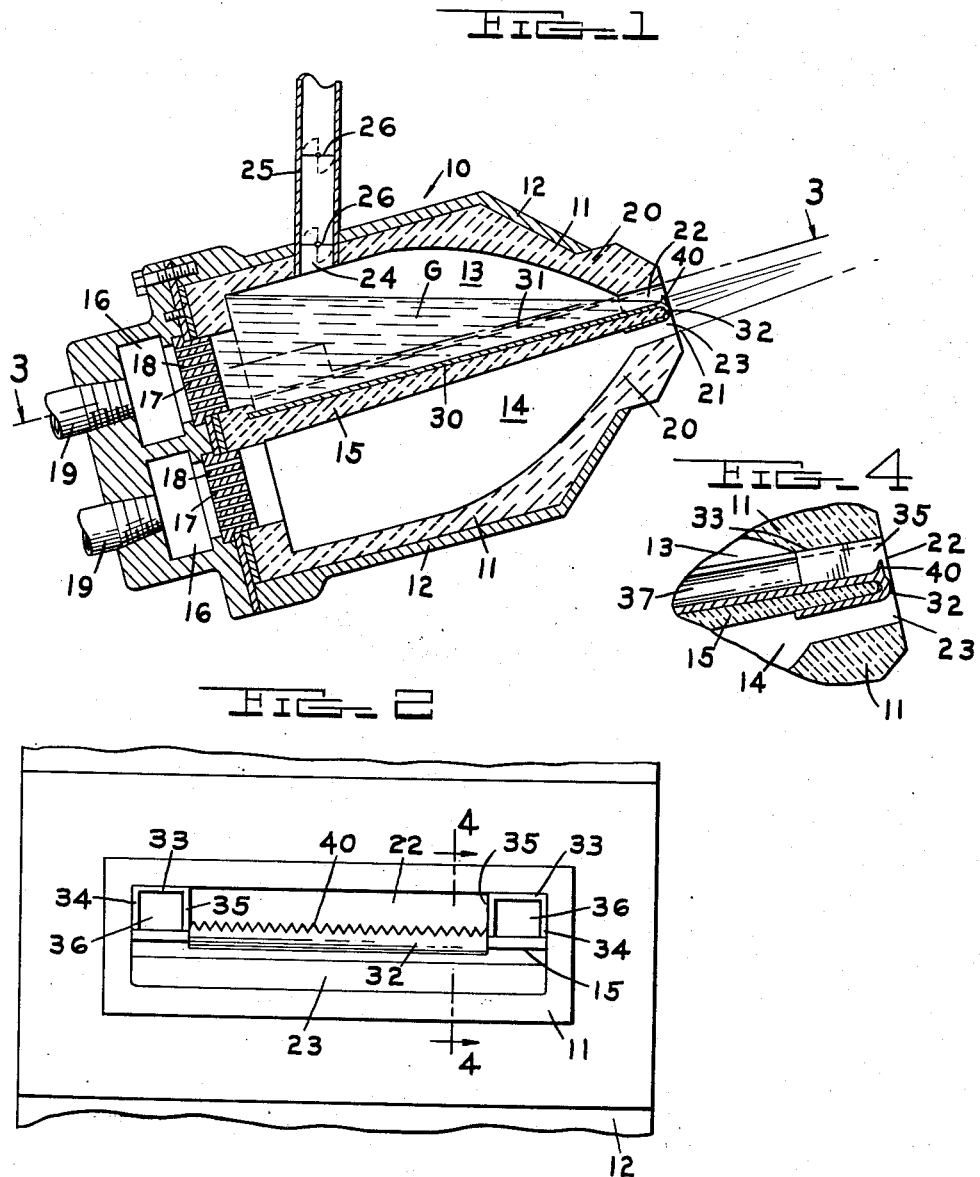
INVENTOR.
CHARLES J. STALEGO
BY
ATTORNEYS Dec. 29, 1953
C. J. STALEGO
2,663,903
METHOD AND APPARATUS FOR PRODUCING FIBERS
Filed Nov. 2, 1948
2 Sheets-Sheet 2
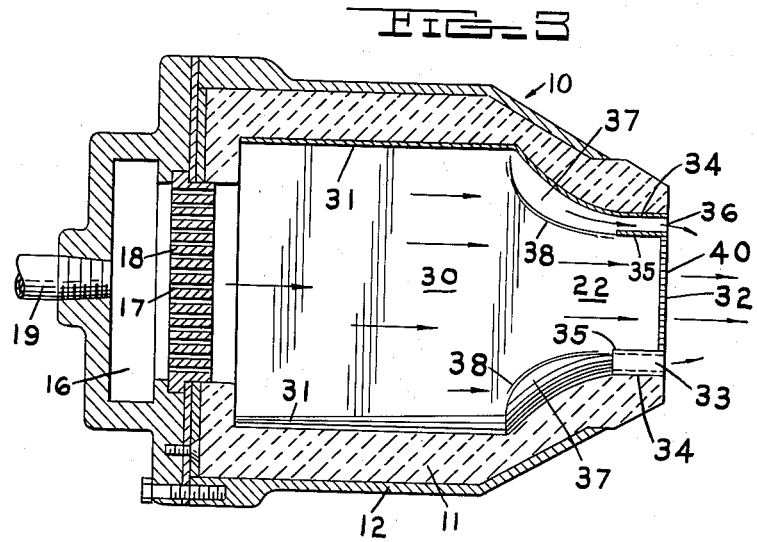
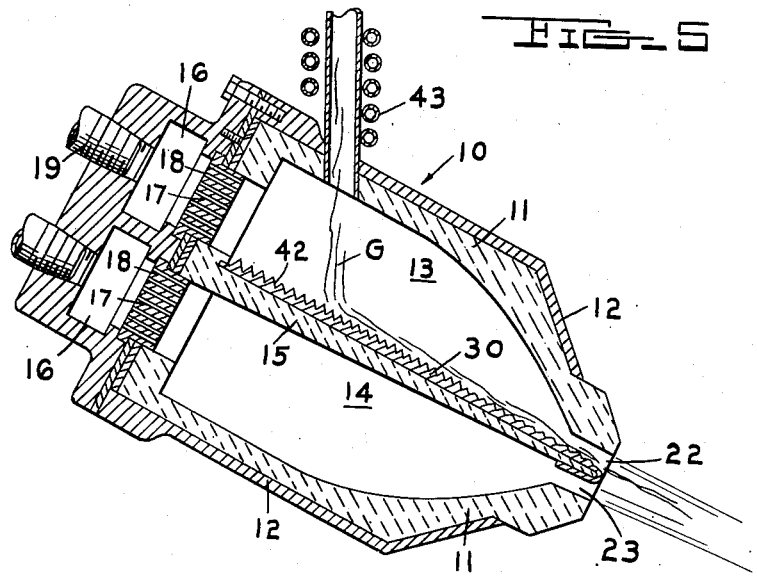
INVENTOR.
CHARLES J. STALEGO
BY
Staelin + Overman
ATTORNEYS Patented Dec. 29, 1953

2,663,903

UNITED STATES PATENT OFFICE 2,663,903

METHOD AND APPARATUS FOR PRODUCING FIBERS

Charles J. Stalego, Newark, Ohio, assignor to Owens-Corning Fiberglas Corporation, a corporation of Delaware Application November 2, 1948, Serial No. 57,903

15 Claims. (Cl. 18—2.5)

This invention relates to a method and apparatus for producing fibers from thermoplastic materials such, for example, as glass.

Fine glass and mineral wool fibers have heretofore been produced by several well known processes which include flowing a stream of the material in a highly molten state and impinging the stream with a blast of air or steam under high pressure. The stream is disrupted by the blast into a multiplicity of fine particles which are attenuated by the force of the blast into fibers by what is commonly known as an atomizing action. The production of fibers of a uniform quality by this process requires a substantially constant high temperature in the glass and since the rate of glass flow is fairly rapid a large volume of supply must be maintained. This necessitates the expense of bringing the supply body up to and holding it at a temperature at which the glass is substantially fluid.

Another method of forming fibers embodies flowing molten glass from a suitable feeder or melter in the form of a multiplicity of streams which are attenuated to produce glass rods or primary filaments of given diameter by means of coacting feed rolls located below the feeder a sufficient distance to assure cooling of the streams to solidification before engagement by the feed rolls.

The rods or filaments are projected by the feed rolls into a gaseous blast having a temperature exceeding the softening temperature of the glass rods and having a velocity sufficient to draw out the softened rods into fibers of the selected size. A blast having the requisite characteristics may be produced by an internal combustion type burner having a chamber in which a combustible gaseous mixture is burned with a high rate of combustion and having an outlet opening through which the products of combustion are discharged. The outlet opening is elongated in a direction extending transversely of the chamber and has a cross sectional area so proportioned with respect to the cross sectional area of the chamber that the gaseous products of combustion are discharged through the outlet in the form of a ribbon-like blast moving at substantial velocity.

A primary object of the present invention is the production of fibers from thermoplastic materials such as glass, by a process which is free of the above difficulties and limitations.

One of the principal objects of this invention is to provide a burner assembly wherein the combustion chamber serves as a container for molten glass and wherein the glass is blown or drawn out from the outlet opening by the force of the products of combustion escaping through the outlet opening. This arrangement renders it possible to eliminate the glass rod or filament forming equipment with the accompanying difficult handling problems and thereby greatly simplifies the process as well as the apparatus briefly noted above.

Another object of this invention is to provide the chamber with a bottom wall of high heat resistant material adapted to be wetted by the glass and having a portion at the front end of the chamber forming the bottom wall of the outlet opening. Thus the molten glass flows over the bottom wall into the outlet opening where it is subjected to the force of the high velocity blast and is blown from the outlet opening.

Still another feature of this invention is to provide means for feeding glass batch, glass cullet or molten glass directly from a forehearth into the combustion chamber of the burner. The temperature developed in the chamber by the high rate of combustion taking place in the chamber far exceeds the melting point of the glass and is sufficient to either melt glass cullet or reduce glass batch to a molten state in a matter of seconds. In the event molten glass from a forehearth or equivalent feeder is introduced to the chamber, the extremely high heat existing in the latter superheats the molten glass to temperatures of 3000° F. or more. This feature enables feeding the molten glass into the chamber at temperatures somewhat lower than the optimum and this is a decided economical advantage since it enables operating the glass melter at lower temperatures.

A further object of this invention is to cover the inner surface of the bottom wall with a high temperature resistance liner adapted to be readily wetted by molten glass and having a portion extending over the bottom wall of the outlet opening provided with means for confining the molten glass to a path somewhat less in width than the length of the outlet opening. Thus spaces are provided between opposite sides of the glass stream and adjacent ends of the outlet opening for the passage of the gaseous products of combustion. This arrangement is advantageous in that it avoids piling up or accumulation of molten glass at the opposite ends of the outlet opening and assures obtaining a product of more uniform quality.

A still further object of this invention is to provide projections or serrations on the top surface of the liner at the delivery side of the outlet opening where they extend into the blast and enable molten glass to be drawn out from the projections by the force of the blast into fibers.

Still another object of this invention is to direct a second intensely hot high velocity gaseous blast in the general direction of the blast previously described and across the bottom of the front edge of the liner or bottom wall of the combustion chamber. The force available in the second blast combines with the first blast in blowing molten glass from the outlet opening. In accordance with this invention the second blast is produced by burning a combustible gaseous mixture in a chamber positioned directly beneath the first chamber and having a similar outlet opening through which the products of combustion are discharged. The bottom wall of the first chamber forms the top wall of the second chamber and the outlet openings are respectively located at opposite sides of the common wall in such relative positions that the products of combustion issuing from the outlet openings wipe across the front edge of the bottom wall.

The foregoing as well as other objects will be made more apparent as this description proceeds, especially when considered in connection with the accompanying drawings, wherein:

Figure 1 is a longitudinal sectional view through a combustion type burner assembly capable of being used to carry out the various steps of the process forming a part of this invention;

Figure 2 is a front elevational view of the burner assembly shown in Figure 1;

Figure 3 is a sectional view taken substantially on the line 3—3 of Figure 1;

Figure 4 is a sectional view taken on the line 4—4 of Figure 2; and

Figure 5 is a sectional view through a slightly modified form of burner assembly.

The process employed herein for forming a body of glass or heat softenable material having similar characteristics into relatively fine fibers, will be more fully hereinafter understood upon considering one type of apparatus capable of being employed to carry out the various steps of the process. Referring first to the apparatus shown in Figures 1 to 4 inclusive, it will be noted that the numeral 10 designates an internal combustion type burner assembly having a body 11 of a high temperature resistant refractory, and having a metal case 12 of suitable construction enclosing the body of refractory material. Confined by the refractory walls of the body is a relatively large space which is divided into two entirely independent chambers 13 and 14 by a division wall 15 also formed of a high temperature resistant refractory.

The end of the metal casing 12 at the rear of the body 11 is fashioned to provide two intake manifolds 16 respectively communicating with the chambers 13 and 14 through passages 17 formed in the rear walls 18 of the chambers. The selected combustible gaseous mixture is independently fed to the intake manifolds 16 by conduits 19 which extend from suitable carburetion devices not shown herein.

Any suitable type of combustible gas may be used in the operation of the burner assembly, but for reasons of economy, it is preferred to use an ordinary fuel gas, such for example, as natural or manufactured fuel gas. In any case the gas is mixed with the proper amount of air by means of a conventional type of air and gas mixer not shown herein. The gas and air mixture is taken from the mixer at moderate pressure of approximately 1 to 5 p. s. i., or considerably more, if desired, and is led through the conduits 19 to the inlet manifolds 16 for the respective chambers 13 and 14. As will be presently set forth, under certain conditions of operation, it may be desirable to provide different operating characteristics in the two chambers, and this may be accomplished by varying the type and/or pressure of the mixture introduced to either chamber. However, for ordinary conditions of operation, it is preferred to employ the same combustible fuel mixture in both chambers.

The front wall of the burner is formed with a throat portion 20 having an opening 21 at the forward end thereof elongated in a direction extending transversely of the burner. The front end portion of the dividing wall 15 projects through the throat and terminates in a plane including the plane of the opening 21. The width of the portion of the wall 15 extending into the throat 20 corresponds to the length of the opening 21 and divides the opening 21 into two discharge ports 22 and 23. The port 22 communicates with the interior of the chamber 13 and the port 23 communicates with the interior of the chamber 14.

Referring now to the operation of the burner assembly 10, it will be noted that the combustible gaseous mixture admitted to the intake manifolds 16 passes through the orifices 17 in the end walls 18 where it ignites and burns in the two chambers with a very high degree of expansion. During operation of the burner assembly 10, the walls of the two combustion chambers are heated by the burning gas and the heat radiating inwardly from these walls tends to increase the rate at which the gaseous mixture admitted to the combustion chambers burns. The resulting high rate of combustion causes a great expansion of the products of combustion which escape from the respective combustion chambers into the atmosphere through the outlet ports 22 and 23.

In this connection it will further be noted that the dividing wall 15 between the two combustion chambers is exposed to the heat generated in both chambers, and as a consequence, reaches a very high temperature during continued operation of the burner. This feature also has the effect of increasing the rate of combustion in both chambers, and enables burning a greater volume of gas in chambers of a given size. Generally speaking it is preferred to feed as much combustible gaseous mixture into the chambers as possible without causing the combustion to become unstable, or to take place exteriorly of the burner assembly, or to cease altogether.

Inasmuch as combustion is effected independently in the two chambers, it is possible to alter the operating characteristics of the burner assembly by making one of the chambers larger than the other. However, for ordinary operations, it is preferred to provide chambers of substantially the same capacity, so that the operating pressures applied to opposite sides of the dividing wall 15 are practically the same. Such an arrangement avoids any possibility of deformation of the wall by the pressures existing in the two chambers.

Although the discharge ports in the front wall of the burner assembly are elongated in a direction extending transversely of the chambers, nevertheless, the cross sectional areas of these ports are so proportioned with respect to the cross sectional areas of the chambers that the products of combustion escaping through the discharge ports are greatly accelerated. The products of combustion escaping through the respective ports join at the front edge of the dividing wall 15, and form a blast of intensely hot gas moving at a substantial velocity.

The most efficient relationship between the cross sectional areas of the outlet openings and the corresponding area of the respective combustion chambers may be readily determined by simple trial, and depends largely on the heat and velocity required in the blast to perform the specified operation. For example in producing relatively fine glass fibers, it is important to so proportion the outlet ports that the resulting blast has a temperature exceeding the softening point of glass and has a velocity sufficient to provide the force required to draw out or attenuate the softened glass into fibers of the specified size. Generally speaking the cross sectional area of each outlet port may be in the range of ⅛ to ¼ of the cross sectional area of the respective combustion chamber. With such an arrangement, it is possible to provide a gaseous blast having a temperature in the region of the burner exceeding 3000° F. and having velocities in excess of 1250 feet per second.

In the embodiment of the invention shown in Figure 1 of the drawings, the burner assembly 10 is supported in a position wherein the combustion chamber 13 is located directly above the combustion chamber 14, and wherein the front end of the burner is elevated. It will also be noted from Figure 1 of the drawings that a pool of molten glass G is contained in the chamber 13 and is maintained at such a level that the top surface of the pool coincides with the front edge of the dividing wall 15. The glass is supplied to the chamber 13 through an opening 24 formed in the top wall of the burner assembly between the throat 20 and the perforated rear wall 18 of the chamber. The opening 24 is connected to a vertical conduit 25, and the latter in turn is connected to a source of glass supply. Glass may be supplied to the chamber 13 in various different forms.

For example, the combustion chamber 13 may be used as a melter for the glass in which event glass cullet, such for example, as prefabricated marbles or raw glass batch may be fed directly into the chamber 13 through the conduit 25. On the other hand, the combustion chamber 13 may be employed to superheat molten glass, in which event the conduit 25 may be connected directly to a forehearth (not shown), so that molten glass is introduced into the combustion chamber 13. In any case a pair of valves 26 are preferably provided in the conduit 25. These valves are spaced from each other in the direction of length of the conduit, and are alternately operated in order to prevent the escape of either combustible gaseous mixture or products of combustion during the interval glass is fed to the chamber 13. However, pressure may be applied over the molten supply body or other batch materials to not only assist in feeding the material but also prevent the escape of gases from the combustion chamber. In instances where molten glass is fed to the burner chamber pressure may be applied to the surface of the glass in the forebay or primary melting chamber by any well known process.

During operation of the burner assembly, the temperature in the combustion chamber 13 substantially exceeds 3000° F., which is greater than the melting point of glass. Thus glass batch or glass cullet introduced to the chamber 13 is converted to a molten state within a matter of seconds, and the pool G indicated in Figure 1 of the drawings is thereby readily formed. Due to the high rate of combustion which takes place in the chamber 14, the dividing wall 15 which forms the bottom wall of the chamber 13 becomes extremely hot and greatly assists in providing the temperature required to very quickly melt the glass introduced to the chamber 13. In the event it is selected to feed molten glass into the combustion chamber 13 from a forehearth or other feeder, it is possible to operate the forehearth or feeder at lower temperatures, and to superheat the molten glass in the combustion chamber 13.

The operation of the forehearth or feeder at lower temperatures is very important in that it enables substantially reducing the cost of production. In either case it will be noted from Figure 1 of the drawings that the pool of molten glass G covers or substantially covers the inner surface of the rear wall 18 of the chamber 13. However, this glass does not interfere with the passage of the combustible gaseous mixture through the restricted orifices 17 in the wall 18. On the contrary, the gases in effect filter through the molten glass and actually burn in contact with the glass.

In order to protect the dividing wall 15 and at the same time provide a surface which is readily wetted by molten glass, a liner 30 is supported on the top surface of the wall 15. The liner 30 is preferably formed of a relatively thin sheet of metal having high heat resistant characteristics, such for example, as platinum, and is of sufficient size to cover the entire top surface of the wall 15. The liner 30 has an upstanding marginal flange 31 at opposite sides which conforms to the contour of the chamber 13, and engages the inner surfaces of the opposite side walls of this chamber. Upon reference to Figures 3 and 4 of the drawings, it will be noted that the liner 30 has a portion 32 of reduced width which extends through the throat 20, and is bent over the front edge of the dividing wall 15 to not only assist in securing the liner in place, but to also protect the front edge portion of the wall 15 from the products of combustion issuing from the discharge port 23 for the chamber 14.

The width of the forwardly projecting portion 32 on the liner is less than the length of the discharge port 22, and is centrally positioned in the discharge port 22 by inverted channel-shaped portions 33 formed on the liner at opposite sides of the portion 32. As shown in Figure 2 of the drawings, the outer flanges 34 of the channels respectively engage opposite end walls of the port 22 and rest on the top of the dividing wall 15. The inner flanges 35 of the channels 33 cooperate with one another to confine the molten glass stream entering the discharge port 22 to a path corresponding in width to the portion 32 of the liner.

The respective channels cooperate with the adjacent portions of the dividing wall 15 to form passages 36 at opposite sides of the path of movement of the molten glass along the reduced portion 32 of the liner. The rear ends of the passages 36 respectively communicate with upwardly opening ports 37 formed at opposite sides of the liner adjacent the rear end of the portion 32. The ports 37 communicate with the combustion chamber 13 to enable products of combustion to pass through the passages 36. Suitable flanges 38 are formed at the inner sides of the ports 37 to prevent the entrance of molten glass into the passages 36.

It has previously been stated that the level of molten glass G in the chamber 13 is maintained so that a quantity of molten glass extends into the discharge port 22 in the manner diagrammatically indicated in Figure 1 of the drawings. This molten glass is subjected to the force of the products of combustion escaping through the port 22, and the velocity of the gaseous products of combustion is sufficiently high to provide the force required to blow molten glass into the atmosphere from the tip or front edge of the liner 30. The stream of gas issuing from the discharge port 22 is assisted in blowing molten glass into the atmosphere by the stream of products of combustion discharging through the bottom port 23. As stated above the stream of gas issuing from the port 23 combines with the stream of gas issuing from the port 22 immediately adjacent the front edge of the liner 30. Thus in effect the molten glass at the tip or front edge of the liner 30 is engaged between the two high velocity blasts and is blown with considerable force into the atmosphere. Any tendency for molten glass to "pile up" or accumulate at the flanges 35 of the liner is prevented by the high velocity blast flowing into the atmosphere through the passages 36 previously described as positioned at opposite sides of the liner.

If desired the front edge of the liner may be formed with a series of serrations or upwardly extending projections 40. This construction is especially advantageous in instances where relatively fine fibers are to be formed, since it enables drawing or attenuating molten glass from the projections or serrations by the force of the blast.

The embodiment of the invention shown in Figure 5 of the drawings differs from the one previously described in that the burner assembly is supported in such a position that the common dividing wall 15 between the two combustion chambers is inclined downwardly to some extent. With this construction molten glass does not accumulate in the top combustion chamber 13 in the form of a pool and is fed by gravity to the outlet port 22. If desired the flow of molten glass to the outlet port 22 may be retarded to some extent by forming transverse serrations 42 in the top surface of the liner 30. These serrations, together with the pressure conditions at the discharge port 22, act to control the flow of molten glass to the front edge of the liner where the blowing takes place.

It will further be noted from Figure 5 of the drawings that molten glass is shown as introduced to the top chamber 13 from a forehearth or equivalent type of glass feeder. In order to avoid excessive cooling of the molten glass while in the supply conduit 25, a suitable heating device 43 may be provided. In the specific embodiment of the invention, the heating device is shown as an electrically operated coil, but other forms of heating equipment may, of course, be used. With the above exceptions, the embodiment of the invention shown in Figure 5 is similar to the one previously described, and the same reference characters are used to indicate corresponding parts.

I claim:

1. The process of producing relatively fine fibers which comprises burning a combustible gaseous mixture in separate chambers having a wall common to the chambers, discharging the products of combustion from the chambers through restricted ports located at opposite sides of the wall, introducing glass into one chamber under a pressure at least as great as the pressure within the chamber, melting the glass in contact with the gases of combustion taking place in the chamber, flowing the molten glass along said common wall toward the outlet opening in said one chamber, and blowing the molten glass from said wall by the force of the gases issuing from said outlet openings.

2. The process of forming relatively fine glass fibers which comprises burning a combustible gaseous mixture in separate superposed chambers having a wall common to said chambers, discharging the products of combustion from the chambers in the form of high velocity streams through outlet openings located in the front walls of the chambers at opposite sides of the common wall to cause the streams of gas to flow across the front edge of the wall with a wiping action, heating glass in the uppermost chamber by the heat resulting from the combustion taking place in this chamber to a temperature exceeding the melting point of the glass, flowing the molten glass along the common wall to the front edge of said wall, and blowing molten glass from said wall by the force of the gases flowing through the outlet openings across the front edge of the wall.

3. The process of producing glass fibers which comprises burning a combustible gaseous mixture in separate chambers located one above the other and having a common wall, discharging the products of combustion from the chambers in the form of high velocity streams of gas through outlet openings located in the front walls of the chambers at opposite sides of the common dividing wall whereby the streams of gas flow across the front edge of the wall as they issue from the outlet openings, introducing glass into the upper most combustion chamber and heating the glass to a temperature exceeding the melting point of glass by the combustion taking place in said uppermost chamber, flowing the molten glass in the form of a stream along the common wall to the front edge of said wall, and drawing glass from the front edge of the wall by the force of the gases issuing from the outlet openings.

4. The process of producing glass fibers which comprises burning a combustible gaseous mixture in separate chambers located one above the other and having a common wall, discharging the products of combustion from the chambers in the form of high velocity streams of gas through outlet openings located in the front walls of the chambers at opposite sides of the common dividing wall whereby the streams of gas flow across the front edge of the wall as they issue from the outlet openings, introducing molten glass into the uppermost combustion chamber to form a pool therein whereby the gases of combustion pass through the molten glass, flowing the molten glass along the common wall to the front edge of said wall, and drawing molten glass from the front edge of the wall by the force of the gases issuing from the outlet openings.

5. The process of producing relatively fine glass fibers which comprises burning a combustible gaseous mixture in a chamber to provide a temperature in the chamber exceeding the melting point of glass, discharging the products of combustion from the chamber through an outlet opening restricted to provide an intensely hot high velocity blast of gas issuing from the outlet opening, heating glass in the combustion chamber by passing the gases of combustion taking place in said chamber through the glass to a temperature exceeding the melting point of the glass, flowing the molten glass to said outlet opening, narrowing the stream of glass as it approaches the outlet opening and directing products of combustion along opposite sides of the stream and between the sides of said stream and the corresponding sides of the outlet opening, and blowing molten glass from the outlet opening by the force of the blast issuing from the outlet opening.

6. The process of producing glass fibers which comprises burning a combustible gaseous mixture in separate chambers located one above the other and having a common wall, discharging the products of combustion from the chambers in the form of high velocity streams of gas through outlet openings located in the front walls of the chambers at opposite sides of the common dividing wall whereby the streams of gas flow across the front edge of the wall as they issue from the outlet openings, introducing glass into the uppermost combustion chamber and heating the glass to a temperature exceeding the melting point of glass by passing the gases of combustion taking place in said uppermost chamber through the glass, flowing the molten glass in the form of a stream along the common wall to the front edge of said wall, confining the stream of glass as it approaches the outlet opening in the top chamber to provide a space between opposite sides of the stream and adjacent sides of the last named outlet opening, directing products of combustion from the top chamber through said spaces, and drawing glass from the front edge of the wall by the force of the gases issuing from said outlet openings.

7. Apparatus for producing glass fibers, comprising a burner assembly having a chamber in which a combustible gaseous mixture is burned to provide a temperature in the chamber exceeding the melting point of glass, a restricted outlet opening in the front wall of the burner through which the products of combustion are discharged in the form of an intensely hot high velocity blast, means for feeding glass into the combustion chamber at a point spaced rearwardly of the outlet opening, the bottom wall of the chamber being inclined upwardly to provide a pool of glass in the chamber, and projections on the bottom wall of the outlet opening from which streams of molten glass are drawn from the pool by the force of the blast issuing from the outlet opening.

8. Apparatus for producing glass fibers, comprising a burner assembly having a chamber in which a combustible gaseous mixture is burned to provide a temperature in the chamber exceeding the melting point of glass, a restricted outlet opening in the front wall of the burner through which the products of combustion are discharged in the form of an intensely hot high velocity blast, means for feeding glass into the combustion chamber at a point spaced rearwardly of the outlet opening, the bottom wall of the chamber being inclined upwardly to provide a pool of glass in the chamber, a liner of high temperature resistant material on the inner surface of the bottom wall of the chamber and extending along the bottom side of the outlet opening, and serrations on the portion of the liner in the outlet opening from which molten streams of glass are drawn from the pool by the force of the blast issuing from the outlet opening.

9. Apparatus for forming fine glass fibers, comprising a burner assembly having a pair of chambers in superposed relation and in which a combustible gaseous mixture is burned to provide a temperature in the chambers exceeding the melting point of glass, an outlet opening in the front wall of each chamber elongated in a direction extending transversely of the chamber and restricted in cross sectional area with respect to the cross sectional area of the chamber to discharge the products of combustion from said chamber in the form of a hot high velocity ribbon-like blast, said chambers having a common dividing wall, means for feeding glass into one chamber at a point spaced rearwardly from said outlet opening to provide a pool of glass heated by said gases, a liner on the floor of the upper chamber and having a portion of reduced width extending into the outlet opening for directing molten glass to said outlet opening, and means on the liner at opposite sides of the portion of reduced width forming channels through which products of combustion are discharged.

10. Apparatus for forming fine glass fibers, comprising a burner assembly having superposed chambers in which a combustible gaseous mixture is burned and having an upwardly inclined dividing wall between adjacent chambers, restricted outlet openings in the front wall of the burner at opposite sides of the higher end of the dividing wall through which the products of combustion in the chambers escape in the form of hot high velocity blasts, and means for feeding glass into the uppermost chamber at a point spaced rearwardly from the outlet opening in the latter chamber to provide a pool of molten glass in said chamber whereby said glass is carried from the chamber by the blasts.

11. Apparatus for producing glass fibers, comprising a burner assembly having superposed chambers in which a combustible gaseous mixture is burned and having an inclined dividing wall between adjacent chambers, restricted outlet openings in the front wall of the burner at opposite sides of the dividing wall through which the products of combustion in the chambers escape in the form of hot high velocity blasts, means for feeding glass into the uppermost chamber at a point spaced rearwardly from the outlet opening in the latter chamber, whereby the molten glass flows over the top surface of the dividing wall to the outlet opening in the uppermost chamber.

12. Apparatus for producing fine glass fibers, comprising a burner assembly having superposed chambers in which a combustible gaseous mixture is burned and having an inclined dividing wall between adjacent chambers, restricted outlet openings in the front wall of the burner at opposite sides of the dividing wall through which the products of combustion in the chambers escape in the form of hot high velocity blasts, means for feeding glass into the uppermost chamber at a point spaced rearwardly from the outlet opening in the latter chamber, whereby the glass is heated in said chamber and flows toward the outlet opening in said chamber, and a liner of high heat resistant material extending along the top surface of the dividing wall and having a portion extending into the outlet opening.

13. Apparatus for producing fine glass fibers including, in combination, a burner having a chamber in which a combustible gaseous mixture is burned to provide a temperature in the chamber exceeding the attenuating temperature of glass, a restricted outlet in a wall of the burner through which the products of combustion are discharged in the form of an intensely hot high velocity blast, means for feeding glass into the combustion chamber at a zone spaced from the outlet, a liner of high temperature resistant material on the inner surface of the bottom wall of the chamber and extending along the bottom wall of the outlet and having laterally-spaced upwardly-projecting portions within the outlet forming a plurality of channels through which the products of combustion forming the blast are discharged.

14. Apparatus for producing fine glass fibers including, in combination, a burner having a chamber in which a combustible gaseous mixture is burned to provide a temperature in the chamber exceeding the attenuating temperature of glass, a restricted outlet in a wall of the burner through which the products of combustion are discharged in the form of an intensely hot high velocity blast, means for feeding glass into the combustion chamber at a zone spaced from the outlet, a liner of high temperature resistant material on the inner surface of the bottom wall of the chamber and extending along the bottom wall of the outlet, a portion of the liner within the outlet being formed with a series of serrations from which streams of molten glass are drawn from the chamber by the force of the blast.

15. Apparatus for producing fine glass fibers including, in combination, a burner having a chamber in which a combustible gaseous mixture is burned to provide a temperature in the chamber exceeding the attenuating temperature of glass, a restricted outlet in a wall of the burner through which the products of combustion are discharged in the form of an intensely hot high velocity blast, means for feeding glass into the combustion chamber at a zone spaced from the outlet, a liner of high temperature resistant material on the inner surface of the bottom wall of the chamber and extending along the bottom wall of the outlet and having laterally-spaced upwardly-projecting portions within the outlet forming a plurality of channels through which the products of combustion forming the blast are discharged, a portion of the liner in one of the channels being formed with a series of serrations from which streams of molten glass are drawn from the chamber by the force of the blast.

CHARLES J. STALEGO.

References Cited in the file of this patent

UNITED STATES PATENTS

| Number | Name | Date |
| --- | --- | --- |
| 1,328,446 | Odam | Jan. 20, 1920 |
| 2,178,871 | Drill | Nov. 7, 1939 |
| 2,233,304 | Bleakley | Feb. 25, 1941 |
| 2,405,036 | Hoffman | July 30, 1946 |
| 2,455,907 | Slayter | Dec. 7, 1948 |
| 2,554,486 | Austin | May 29, 1951 |